May 2, 1944. C. A. WOODWARD 2,347,863
FASTENER AND FASTENER ASSEMBLY
Filed April 30, 1941
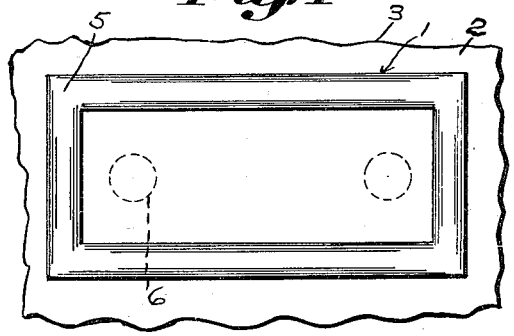
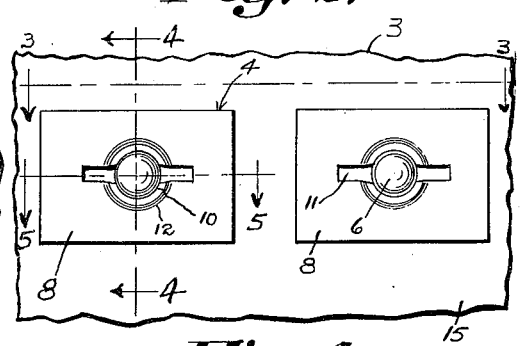
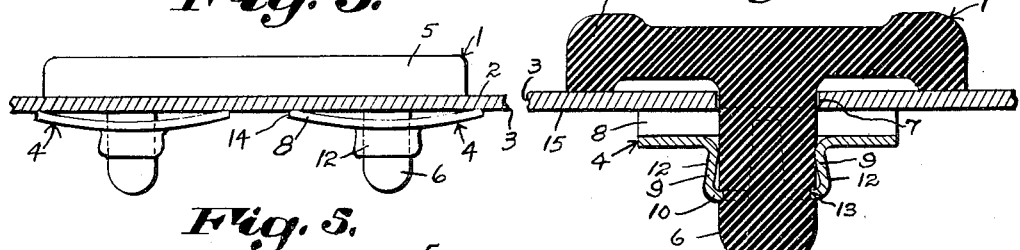
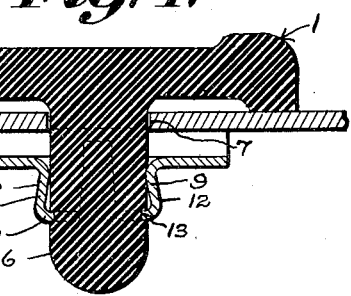
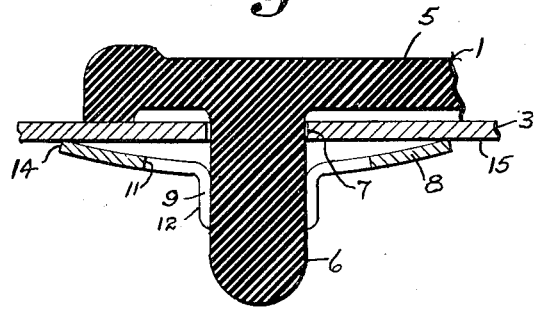
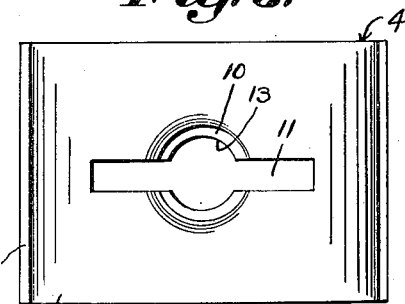
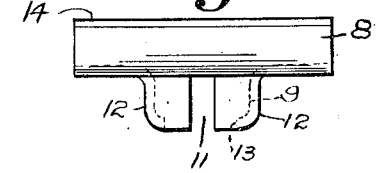
Inventor:
Clement A. Woodward
By John Todd Atty.

Patented May 2, 1944

2,347,863

UNITED STATES PATENT OFFICE 2,347,863

FASTENER AND FASTENER ASSEMBLY

Clement A. Woodward, Dedham, Mass., assignor to United-Carr Fastener Corporation, Cambridge, Mass., a corporation of Massachusetts Application April 30, 1941, Serial No. 391,107

3 Claims. (Cl. 24—73)

This invention relates to improvements in fastener members and fastener installations and particularly to those installations in which a part to be supported of plastic and the like material is secured to a supporting panel.

The broad object of my invention is directed to an installation in which a part to be supported, such as an ornamental member, is secured to a supporting panel by an improved fastener member in gripping engagement with a stud or connecting member provided as a part of the ornamental member to effect a secure and reliable assembly.

A more specific object of my invention relates to the construction of the fastener member wherein it provides a base and opposed stud-engaging portions constructed to resiliently engage and, in preferred applications, bite into a stud, but shaped to provide means restricting the depths to which the stud-engaging portions may enter the material of the stud.

A further object of my invention is directed to a spring fastener operating in combination with a supporting panel and plastic stud of the part to be supported in a way to maintain constant gripping engagement with the stud even though the material of the stud "cold flows" to some extent. It is well known to those skilled in the art that thermoplastic material under pressure tends to "cold flow" when subjected to a certain degree of heat. Thus automobile manufacturers have been concerned with the problem of flow in connection with attaching devices for securing ornamental parts now used to embellish the interiors of automobiles where the automobiles are located in the warmer climates.

Certain known fasteners which are satisfactory under ordinary conditions for reliably holding the stud are unable, when the material starts to flow, to maintain a secure grip on the stud. The present invention is intended to solve this problem and is directed to an improved spring fastener having a normally bowed base and yieldable stud-engaging portions extending from the base to receive and grip a stud member between them. The base is flattened against the supporting panel in tightened-down position and cooperates with the panel to exert an axial thrust on the stud through the stud-engaging portions. The direction of movement of the stud-engaging portions is opposed to the direction in which the base is bowed so that the stud-engaging portions exert a constant tension on the stud irrespective of any change in the arc of the base which might be brought about as a result of the "cold flow" of the material of the stud.

Other objects and uses of my invention will be apparent from inspection of the drawing and specification hereinbelow set forth.

Referring to the drawing, in which I have illustrated a preferred embodiment of my invention:

Fig. 1 is a top plan view of an installation embodying my invention;

Fig. 3 is a bottom plan view of the installation shown in Fig. 1;

Fig. 3 is a section taken on the line 3—3 of Fig. 2;

Fig. 4 is an enlarged section taken along the line 4—4 of Fig. 2;

Fig. 5 is an enlarged section taken along the line 5—5 of Fig. 2;

Fig. 6 is an enlarged rear view of my improved fastener member per se;

Fig. 7 is a side elevation of the fastener shown in Fig. 6; and

Fig. 8 is an end elevation of the fasteners shown in Figs. 6 and 7.

Referring to Figs. 1–3 of the drawing, I have shown a preferred fastener installation in which a part to be supported, such as an ornamental member 1, is secured in abutment to the exterior surface 2 of a relatively thin supporting panel 3 by means of one or more of my improved fastener members 4. The part to be supported 1 is preferably of plastic material, such as Bakelite, Tenite, Catalin and the like, and for purposes of illustration the part 1 is molded in the form of an ornamental member for decorating the exterior surface of a rigid support, which may be the dash or upholstery frame in the interior of an automobile. The ornamental member 1 comprises, in simplest form, a body 5 adapted to be disposed on the exterior surface of the supporting panel and a pair of studs 6 integrally molded with the body 5 and projecting outwardly therefrom. The studs 6, preferably, are circular in cross-section and have a smooth outer surface. The studs extend through openings 7 of the panel 3 and beyond the rear surface of the panel in assembly of the parts. The fastener members 4 are engaged with the studs 6 from the rear side of the panel 3 and cooperate with the stud and panel to draw the body 5 of the ornamental member tightly against the exterior surface 2 of the panel 3 to effect a tight and reliable assembly. Although my fastener is constructed particularly for cooperation with a stud of plastic material for securing a part to a support, it is understood that I do not wish to limit my invention exclusively to this type of material as the fastener is also capable of satisfactory operation with other materials such, for example, as wood, metal and the like, to provide a tight assembly.

Referring in detail to my preferred fastener member illustrated in the drawing, I have shown one made entirely from one piece of sheet metal. The fastener member 4 comprises a base portion 8 which is preferably rectangular in shape. The base 8 is bowed in a longitudinal direction to effect a substantial arc for a purpose hereinbelow set forth. A stud-engaging means in the form of a hollow projection is drawn from the material of the base substantially at the center thereof. The projection provides a cylindrical wall 9 extending in substantially perpendicular relation to the normal plane of the base and defining a stud-receiving passage. The cylindrical wall has an annular lip 10 (Figs. 4 and 6) at the forward end of the projection extending inwardly in a plane substantially normal to the axis of the projection and defining an opening which is normally less than the diameter of the stud 6. The projection has a slot 11 extending from its forward end into the base 8 so as to divide the projection into a pair of yieldable arcuate segments 12—12, each of which provides a portion of the lip 10. The segments 12—12 are disposed in opposed relation and are adapted to expand when a stud is extended between them and thereafter tend to move toward each other under the normal spring tension of the fastener to engage the free edges 13 of the lip portions 10 with the outer surface of the stud. It will be noticed that, in my preferred form, the line of movement of the segments 12—12 is in right-angular relation to the direction in which the base 8 is bowed. This construction operates to increase the efficiency of the fastener, as hereinafter described.

In assembling the parts of the installation the stud portions 6 are moved through the respective opening 7 until the body 5 of the ornamental member 1 abuts the exterior surface 2 of the supporting panel. Next, the fastener members are forced over the free ends of the studs 6. The segments 12—12 expand against their normal spring tension as the stud is extended therebetween and then tend to move toward each other under spring tension causing the free edges 13 to enter biting engagement with the stud 6. Most plastics now in common use do not have a surface hardness which will resist penetration of the edges 13 where the edges have sufficient tension behind them to grip firmly the stud.

One of the features of my invention results from the fact that the arcuate walls 9 of the segments 12—12, which normally project in substantially perpendicular relation to the general plane of the base 8, tend to abut the outer surface of the stud 6 so as to limit the distance the lip portions 10 may dig into the material of the stud portions to the distance between the free edges 13 thereof and the wall 9. This feature is clearly shown in Fig. 4 in which it will be seen that the lip portions 10 can penetrate farther into the stud 6 a distance no greater than the distance the wall 9 of the segments 12—12 can move toward each other to assume their normal perpendicular relation to the base 8. As a result of this construction, the segments 12 are enabled to take up ordinary reduction in diameter of the stud 6 resulting from "cold flow." Also, it is impossible for the lip portions 10 to penetrate the stud a relative distance which would so weaken the stud as to offer a chance of its snapping off at the point of its length engaged by the free edges 13. This feature, wherein movement of the biting edges toward each other under spring tension is limited, is particularly useful in connection with the attachment of supported parts providing a stud of relatively small diameter.

The function of the bowed base 8 is to exert an axial tension on the stud through the segments 12—12 tending to pull the body 5 of the ornamental part firmly against the panel 3. Thus, when the fastener is moved over the stud 6 into tightened-down position, the base takes a more flattened shape with its opposed ends 14 engaging the rear surface 15 of the panel 3. As the base attempts to assume its normal bowed shape, an axial thrust is exerted upon the stud 6 in a direction away from the supporting panel through the segments 12. When the ornamental member is subjected to a certain top working temperature of heat, which working temperature varies with different types of plastics, the stud flows or lengthens out slightly under the axial pressure exerted by the fastener and at the same time its diameter may be reduced. As the stud "cold flows," it carries the segments 12—12 away from the supporting panel causing the base 8 to assume a more concave shape. In fastener members now in common use, in which the stud retainer portions are contractible and expansible in a direction in registration with the direction in which the base is bowed, the stud retainer portions are caused to move apart slightly as the base assumes its more normal shape with consequent relaxing of gripping force. However, as a result of the construction of the present fastener, in which the yieldable segments 12—12 are movable in a direction opposed to the direction in which the base is bowed, the segments 12—12 will be unaffected by any tendency of the base to assume its normal bowed shape and as a result the yieldable segments exert a constant tension on the stud irrespective of the change of shape of the fastener base.

Thus by my invention I have provided a fastener member of simple and inexpensive construction capable of cooperation with a stud or shank extending from a supported part of thermoplastic material and the like carrying out the desired objects.

Although I have illustrated and described a preferred embodiment of my invention, I do not wish to be limited thereby because the scope of my invention is best defined by the following claims.

I claim:

1. A fastener member adapted to be slipped upon and retained in gripping engagement with a stud part extending from a supported part to secure said supported part to a supporting panel, said fastener having a base bowed in one direction, stud-engaging means in the form of a hollow projection extending from said base, said hollow projection having an inner stud-engaging wall formed with an inwardly extending stud-gripping portion at the forward end thereof and defining a stud-receiving opening normally of less diameter than the diameter of the stud and said projection being slotted axially to the base dividing said projection into a plurality of transversely yieldable arcuate segments integrally joined to said base, said base being continuous in all directions surrounding said slot; said segments being yieldable at their junction with the base in a direction normal to the direction of curvature of said base, said bowed base being adapted to cooperate with said panel in tightened-down position to exert an axial tension on said stud through said segments to draw said supported part tightly against said panel.

2. A fastener member adapted to be slipped upon and retained in gripping engagement with a stud part extending from a supported part to secure said supported part to a supporting panel, said fastener having a base bowed in one direction, stud-engaging means in the form of a hollow projection extending in a direction substantially normal to the outer bowed surface of said base, said hollow projection having an inner stud-engaging wall formed with an inwardly extending stud-gripping portion at the forward end thereof and defining a stud-receiving opening normally of less diameter than the diameter of the stud and said projection being slotted axially to the base and in the direction of curvature of said base dividing said projection into a pair of opposed yieldable arcuate segments integrally joined to said base, said base being continuous in all directions surrounding said slot, said segments being yieldable at their junction with the base transversely to said slot and in a direction normal to the direction of curvature of said base, said bowed base being adapted to cooperate with said panel in tightened-down position to exert an axial tension on said stud through said segments to draw said supported part tightly against said panel.

3. A fastener member for engagement with a stud part extending from a supported part to secure said supported part to a supporting panel, said fastener comprising a longitudinally bowed base portion formed with a longitudinally extending slot therein, stud-engaging means including opposed semi-cylindrical segmented projections extending substantially normal to the outwardly bowed surface of said base portion and integrally joined to the base at the opposed marginal edges of said slot, said projections having substantially straight inner stud-engaging walls and inturned stud-gripping portions at the outer ends thereof and cooperating to define a stud-receiving opening normally of less diameter than the stud, said segmented projections being yieldable transversely of said base and slot to accommodate a stud as the fastener is slipped thereon, and said bowed base being adapted to cooperate with said panel in tightened-down position to exact an axial tension on said stud through said segmental projections to draw said supported parts tightly against said panel.

CLEMENT A. WOODWARD.